Sept. 30, 1969   W. LEINER   3,470,512
THERMOSTATIC SWITCH HAVING ELEMENTS RESPONSIVE TO
AMBIENT TEMPERATURE AND CURRENT FLOW
Filed May 2, 1967
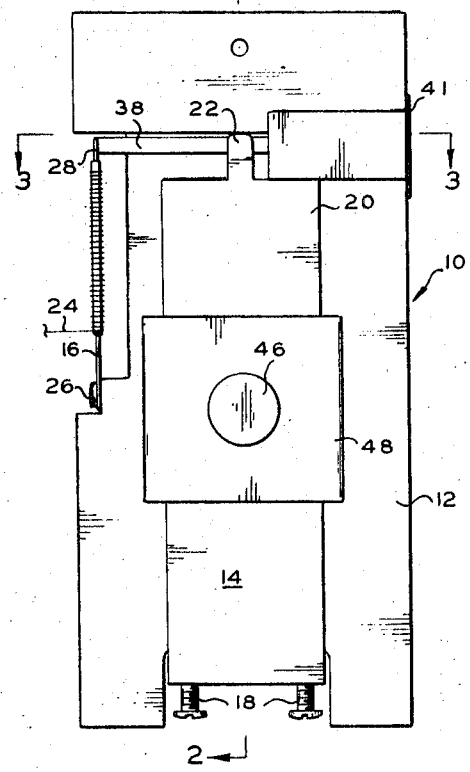
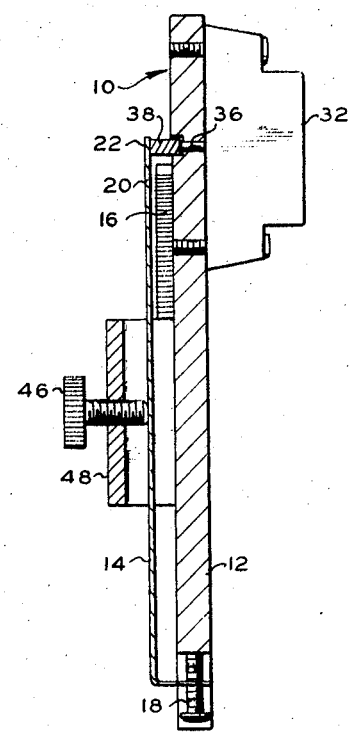
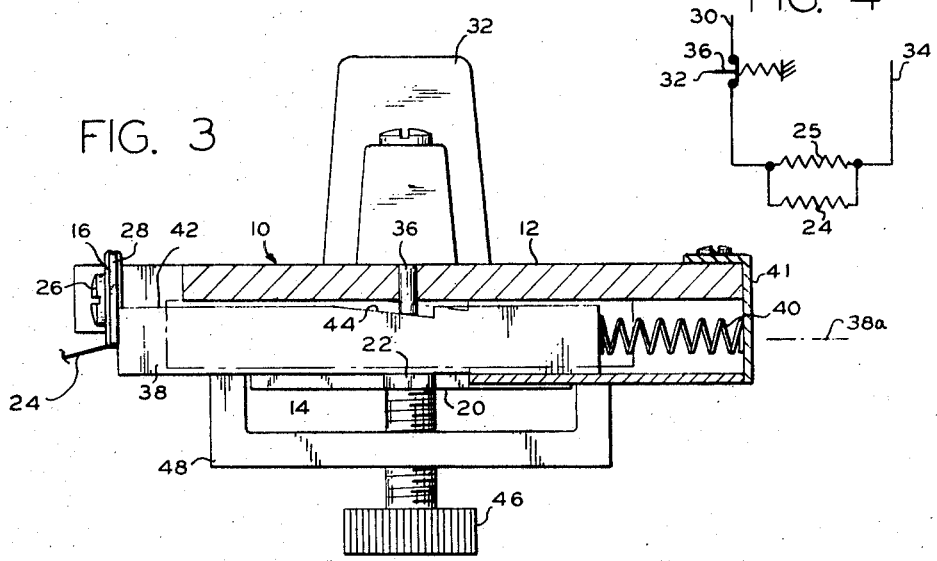
WILLIAM LEINER
INVENTOR
BY
BUCKHORN, BLORE, KLARQUIST & SPARKMAN
ATTORNEYS

United States Patent Office 3,470,512
Patented Sept. 30, 1969

3,470,512
THERMOSTATIC SWITCH HAVING ELEMENTS RESPONSIVE TO AMBIENT TEMPERATURE AND CURRENT FLOW
William Leiner, Rte. 2, Box 56, Corvallis, Oreg. 97330
Filed May 2, 1967, Ser. No. 635,628
Int. Cl. H01h 37/52, 61/02, 71/16
U.S. Cl. 337—35                                          4 Claims

ABSTRACT OF THE DISCLOSURE

A thermostatic switch for an electric heater having a first thermostatic element responsive to the temperature of the ambient atmosphere and a second thermostatic element responsive to the flow of current through the heater. The two thermostatic elements are adapted to exert pressure on an actuating cam rod in mutually perpendicular directions to break the electrical circuit through the heater.

Background of the invention

This invention relates to an improved thermostat for for electrical heating elements.

In my copending application for United States patent, Heater Control, Ser. No. 587,593, filed Oct. 18, 1966, an electrical heating device is disclosed in which the supply of electrical energy to the heating element is controlled by the cumulative effect of the actions of a first thermostatic element responsive to the temperature of the ambient atmosphere and a second thermostatic element responsive to the temperature of the heating element itself. Heating devices so controlled experience relatively small variations in temperature, operate at a relatively-constant low temperature, consume a minimum amount of electrical energy, and last a long time.

Accordingly, it is the primary object of the present invention to provide an improved thermostatic control apparatus of the closs described.

It is a further object of the present invention to provide a thermostatic control apparatus of the class described that will be exceedingly sensitive.

It is a still further object of the present invention to provide a thermostatic control apparatus of the class described that will cycle the heating element on and off with but small variations in the ambient temperature.

It is a still further object of the present invention to provide a thermostatic control apparatus of the class described that will maintain the heating element of an appliance at a substantially uniform, optimum temperature, thereby to meet the heat demands of the environment in which it operates in a manner such that the heat input exactly matches the heat loss.

It is a still further object of the present invention to provide a thermostatic control apparatus of the class described that will achieve significant savings in electrical power consumption.

Summary of the invention

These and other objects and advantages are achieved by the thermostatic control apparatus of the present invention, which comprises an electrical circuit including a switch contact for energizing an electric heater. An actuating bar adapted to exert pressure on the switch contact is provided to open the circuit and de-energize the electric heater upon sufficient pressure being applied thereon.

A first thermostatic element responsive to the temperature of the ambient atmosphere is provided to exert a first pressure on the actuating bar in a first direction. A second thermostatic element responsive to the flow of electrical current through the electric heater is provided to exert a second pressure on the actuating bar in a second direction which is perpendicular to the first direction.

The effects of these first and second pressures on the actuating bar are cumulative, and the cumulative nature of these pressures serves to maintain the temperature of the heating element, and thus the temperature of the room, at an effectively constant degree.

Brief description of the drawings

The invention will be better understood by reference to the following description and the accompanying drawings, in which:

FIG. 1 is a side elevational view of a thermostatic switch for an electric heater constructed in accordance with the present invention;

FIG. 2 is a sectional view taken on line 2—2 of FIG. 1;

FIG. 3 is a sectional view taken on line 3—3 of FIG. 1, showing in full lines the actuating bar in position it normally occupies when the heating element and the room are cold, and in dashed lines, the position the actuating bar normally occupies when the heating element is maintaining the room at a predetermined constant temperature; and FIG. 4 is a circuit diagram.

General description of the preferred embodiment

Referring to the drawings, the thermostat 10 of the present invention comprises a base plate 12 on which are mounted two temperature-sensitive bimetallic elements 14 and 16 in the form of flat plates with their principal planes perpendicular to each other. The first temperature-sensitive bimetallic element 14 is responsive to the ambient atmosphere. The bimetallic element 14 is fixed to the bottom of the base plate 12 by two screws 18. The element 14 has a movable portion in the form of a free end 20 to which is appended a tab 22 for a purpose to be hereinafter described. Increases in the ambient temperature cause the free end 20 of the bimetallic element 14 to flex inwardly toward the base plate 12.

The second bimetallic element 16 is wrapped with a heating wire 24 which is connectable in parallel relation to the electric heating element indicated schematically at 25 in FIG. 4, which may be remote from the thermostat 10. When current energizes the heating element 25, a portion thereof passes through the heating wire 24 and raises the temperature of the bimetallic element 16. The bimetallic element 16 is fixed to the side of the base plate 12 by a screw 26, and has a movable portion in the form of a free end 28 which moves inwardly toward the thermostat as the temperature of the bimetallic element 16 is raised.

Current to the electric heating element is provided by an electrical circuit 30, 34. One of the lead lines thereof, as for example the line 30 in FIG. 4, is interrupted by the thermostat 10 of the present invention by being connected in series relation to a normally-closed switch 32 which is mounted on the back of the base plate 12. The switch 32 is preferably of the momentary snap-acting type such as are sold under the trademark "Micro Switch."

The switch 32 has an operating pin 36 which extends through the base plate 12 in the manner shown. The pin 36 is actuated by an actuating bar or cam rod 38, the position of which is determined by pressure exerted by three elements: (1) the tab 22 on the bimetallic element 14, which exerts pressure on the cam rod 38 in a direction transverse to the longitudinal axis 38a thereof as the temperature of the ambient atmosphere rises, thereby to move the cam rod 38 transversely of itself and exert pressure on the pin 36 of the switch 32; (2)

the free end 28 of the wrapped bimetallic plate 16, which moves inwardly toward the thermostat 10 as the heating element 25 increases in temperature, thereby to exert a second pressure on the cam rod 38 in a direction collinear with the longitudinal axis 38a thereof; and (3) a spring 40 retained by a bracket 41 attached to the base plate 12, which resists the pressure exerted on the cam rod 38 by the plate 16.

A surface 42 of the cam rod 38 adjacent the pin 36 of the switch 32 is provided with a cam surface 44 as shown. The surface 44 slopes in a manner so that as the cam rod 38 is translated along its longitudinal axis 38a by pressure exerted by the free end 28 of the bimetallic plate 16, an increasing amount of pressure is exerted on the pin 36.

A knurled regulating screw 46 mounted on a bracket 48 attached to the base plate 12 is provided to control the temperature of the room by exerting a controllable amount of initial pressure on the bimetallic element 14. As the temperature of the ambient atmosphere increases, the bimetallic plate 14 translates inwardly toward the thermostat 10, thereby to exert pressure on the pin 36 of the switch 32. Hence, a tightening of the screw 46 positions the free end 20 of the bimetallic plate 14 initially closer to the pin 36, hereby to result in the switch 32 being opened at a lower room temperature. Conversely, a backing off of the screw 46 will necessitate a higher room temperature before the switch 32 is opened.

The operation of the thermostatic switch of the present invention is as follows. When the room is cold, the cam rod 38 will be generally in the position shown by the solid lines in FIG. 3, the spring 40 translating the rod 38 to the left to contact the free end 28 of the bimetallic plate 16, and the pressure of the pin 36 maintaining the rod 38 in contact with the tab 22 of the bimetallic element 14.

With the passage of current through the electrical circuit, the heating element 25 will increase in temperature heating the ambient air. Since the bimetallic plate 16 is wrapped with the wire 24, it will increase in temperature much faster than will the bimetallic plate 14 which is responsive only to the temperature of the ambient atmosphere. Thus, as current flows through the circuit, the wire 24 will heat the bimetallic plate 16 which will push the cam rod 38 axially to the right. Inasmuch as there will be relatively little transverse pressure exerted on the rod 38 by the tab 22 of the bimetallic plate 14, the cam rod 38 will have to move a considerable distance axially before the cam surface 44 depresses the pin 36 on the switch 32 to shut off current to the heating element 25.

As the temperature in the room increases, however, the bimetallic plate 14 will exert more transverse pressure on the cam rod 38 and will actually move it closer to the switch 32 depressing the pin 36. The position of the cam rod 38 will then be generally as shown by he dashed lines in FIG. 3. Thus, once the bimetallic plate 14 translates the cam rod 38 laterally or transversely to a position closer to the switch 32, considerably less axial movement of the cam rod 38 is required to actuate the pin 36 to effect opening of the switch 32.

As soon as the circuit is broken, the current will cease flowing through the heater 25, and the temperature of the ambient atmosphere will start to fall. However, the temperature of the wire 24 which is wrapped around the bimetallic plate 16 will fall much faster than the room temperature. Thus, the bimetallic plate 16 is seen to be the more sensitive of the two thermostatic elements, moving more quickly than does the bimetallic plate 14.

As the plate 16 releases its axial pressure on the cam rod 38, the spring 40 will urge the latter to the left. This will release the pressure on the pin 36, permitting the switch 32 to close and pass current through the circuit, thus completing the cycle. The combination of the actions of the two bimetallic plates 14 and 16, therefore, produces an exceedingly fine temperature control, so that exceedingly small axial movements of the cam rod 38 cause the heating element 25 to cycle on and off continually in response to small variations in the ambient temperature. The heating element itself is thus maintained at a relatively constant low temperature, and this, of course, results in great savings in power consumption.

Although the second bimetallic element 16 is herein illustrated and described as being wrapped with a heating wire 24, it should be understood that a suitably designed bimetallic element 16 could be used in series in the circuit and without a heating wire, so that the current which flows through the heating element 25 also flows through the bimetallic element.

Thus, while only a single embodiment of the present invention has been described and illustrated, it should be understood that the specific details shown are merely illustrative and that the invention can be carried out in other ways without departing from the true spirit and scope of the following appended claims.

I claim:

1. A thermostatic switch for an electric heater comprising
   circuit means including a switch contact for energizing said electric heater;
   an actuating bar mounted adjacent said switch contact and having a cam surface thereon, said cam surface being adapted upon longitudinal movement of said bar to exert increasing pressure on said switch contact to open said circuit and de-energize said electric heater;
   a first thermostatic element responsive to the temperature of the ambient atmosphere and adapted to exert a first presusre on said actuating bar to move said bar transversely of itself and cause said cam surface to move toward said switch contact; and
   a second thermostatic element responsive to the flow of current through said electric heater and adapted to exert a second pressure on said actuating bar to move said bar in its longitudinal direction and cause said cam surface to exert pressure on said switch contact;
   the effects of said first and second pressures on said actuating bar being cumulative to move said actuating bar to a position wherein small variations in said temperature of said ambient atmosphere will cause said cam surface to open and close said switch contact responsive to said variations.

2. A thermostatic switch for an electrical heating element, comprising
   a first temperature-sensitive bimetallic element having a fixed portion and a movable portion responsive to the temperature of the ambient atmosphere;
   a second temperature-sensitive bimetallic element having a fixed portion and a movable portion responsive to the flow of current through said heating element;
   electrical circuit means including a normally closed switch for energizing said heating element, said switch having an operating element movable in a given direction; and
   an actuating bar having a sloping cam surface thereon adjacent said operating element and adapted upon movement of said bar to exert increasing pressure on said operating element to open said switch and de-energize said heating element,
      said movable portion of said first temperature-sensitive bimetallic element exerting a first pressure on said actuating bar to move said cam surface in said given direction as said ambient atmosphere temperature rises,
      said movable portion of said second temperature-sensitive bimetallic element exerting a second pressure on said actuating bar in a second direction perpendicular to said given direction as the temperature of said heating element rises to move said cam surface in said second direction and exert pressure on said operating element, said first and second pressures being cumulative to translate said actuating bar sufficiently to move said operating element to open said switch upon a predetermined increase in said temperature of said ambient atmosphere.

3. A thermostatic switch as described in claim 2, in which said second temperature-sensitive bimetallic element is wrapped with a heating wire adapted to be connected into said electrical circuit means so that electrical current flows through said heating wire when said heating element is energized.

4. A thermostatic switch for an electrical heating element comprising,
a base plate;
a first temperature-sensitive bimetallic element in the form of a flat plate having a portion fixed to one side of said base plate and a portion movable toward and away from said base plate, said movable portion being responsive to the temperature of the ambient atmosphere;
a second temperature-sensitive bimetallic element in the form of a flat plate having a portion fixed to one edge of said base plate and a portion movable toward and away from said base plate; said movable portion being responsive to the flow of current through said heating element,
the principal planes of said first and second temperature-sensitive bimetallic elements being disposed at right angles to each other;
a normally-closed switch mounted on the other side of said base plate for connection in a circuit energizing said heating element, said switch having an operating pin extending through said base plate to said one side thereof, said pin being movable in a direction perpendicular to the plane of said base plate;
a heating wire adapted to be connected to said electrical circuit and wrapped around said movable portion of said second temperautre-sensitive bimetallic element so that when current passes through said circuit, said heating wire raises the temperature of said movable portion of said second temperature-sensitive bimetallic element and causes the same to move toward said base plate;
an elongated actuating bar mounted on said one side of said base plate, one side of said actuating bar being adapted to exert pressure on said operating pin to open said switch and de-energize said circuit,
said movable portion of said first temperature-sensitive bimetallic element exerting a first pressure on the opposite side of said actuating bar to move said bar in said direction perpendicular to said plane of said base plate as said temperature of said ambient atmosphere rises,
said movable portion of said second temperature-sensitive bimetallic element exerting a second pressure on one end of said actuating bar in a direction collinear with the longitudinal axis thereof to move said actuating bar in said collinear direction as the temperature of said heating element rises;
a cam surface disposed on said one side of said actuating bar, said cam surface sloping so that as said actuating bar is moved in said collinear direction, an increasing amount of pressure is exerted on said operating pin; and
spring means mounted on the other edge of said base plate and adapted to contact the other end of said actuating bar to resist said second pressure exerted by said movable portion of said second temperature-sensitive element on said one end of said actuating bar,
said first and second pressures being cumulative to translate said actuating bar sufficiently to move said operating pin to open said switch upon a predetermined increase in said temperature of said ambient atmosphere.

References Cited

UNITED STATES PATENTS

| | | | |
|---|---|---|---|
| 1,839,935 | 1/1932 | Thomas | 337—335 |
| 2,069,625 | 2/1937 | Rich | 337—104 |

BERNARD A. GILHEANY, Primary Examiner

R. L. COHRS, Assistant Examiner

U.S. Cl. X.R.

37—104, 335